(12) United States Patent
Iwamoto et al.

(10) Patent No.: US 10,423,192 B2
(45) Date of Patent: Sep. 24, 2019

(54) DISPLAY DEVICE, AND POS TERMINAL DEVICE

(71) Applicants: Takahiro Iwamoto, Kanagawa (JP); Natsuki Hagiwara, Kanagawa (JP); Takashi Nakashima, Kanagawa (JP)

(72) Inventors: Takahiro Iwamoto, Kanagawa (JP); Natsuki Hagiwara, Kanagawa (JP); Takashi Nakashima, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 1557 days.

(21) Appl. No.: 14/353,245

(22) PCT Filed: Oct. 4, 2012

(86) PCT No.: PCT/JP2012/076371
§ 371 (c)(1),
(2) Date: Apr. 21, 2014

(87) PCT Pub. No.: WO2013/061794
PCT Pub. Date: May 2, 2013

(65) Prior Publication Data
US 2014/0254076 A1     Sep. 11, 2014

(30) Foreign Application Priority Data
Oct. 28, 2011   (JP) .................... 2011-237161

(51) Int. Cl.
*G06F 1/16*   (2006.01)
*H05K 5/00*   (2006.01)
(Continued)

(52) U.S. Cl.
CPC ......... *G06F 1/1601* (2013.01); *G07G 1/0018* (2013.01)

(58) Field of Classification Search
CPC .... G06F 1/1601; G06F 1/1607; G06F 1/1613; G06F 1/1633; G07G 1/0018; G07G 1/08; G07G 1/01; G07G 1/12
(Continued)

(56) References Cited

U.S. PATENT DOCUMENTS 6,507,352 B1 * 1/2003 Cohen ................ G06F 1/181
705/16
7,486,505 B2 * 2/2009 Fushimi .................. G06F 1/18
361/679.08
(Continued)

FOREIGN PATENT DOCUMENTS

CN   201215674 Y   4/2009
DE   299008098 U1  7/1999
(Continued)

OTHER PUBLICATIONS

Communication dated Jun. 17, 2015 from the State Intellectual Property Office of the People's Republic of China in counterpart application No. 201280051092.5.
(Continued)

*Primary Examiner* — Anthony M Haughton
(74) *Attorney, Agent, or Firm* — Sughrue Mion, PLLC

(57) ABSTRACT

It is an object of this invention to provide a display device capable of easily adjusting the height thereof without providing an extension and contraction mechanism. The display device (1) of this invention includes: a casing (3); and a display unit (5) to be installed for use onto the casing (3), the casing (3) and the display unit (5) being available to directly couple to each other. A coupling structure between the casing (3) and the display unit (5) is changeable from a state in which the casing (3) and the display unit (5) are directly coupled to each other to a state in which the casing (3) and the display unit (5) are coupled to each other with a pole (7) having a columnar shape and separable along a center axis
(Continued)

thereof, which is mounted between the casing (3) and the display unit (5).

8 Claims, 19 Drawing Sheets

(51) Int. Cl.
*H05K 7/00* (2006.01)
*G07G 1/00* (2006.01)

(58) Field of Classification Search
USPC ............ 361/679.01, 679.02, 679.05, 679.06, 361/679.07, 679.21
See application file for complete search history.

(56) References Cited

U.S. PATENT DOCUMENTS

| | | | | |
|---|---|---|---|---|
| 9,092,200 | B2* | 7/2015 | Richard | F16M 11/10 |
| 9,659,466 | B1* | 5/2017 | Chen | G07G 1/0018 |
| 9,665,861 | B2* | 5/2017 | Femando | G06Q 20/203 |
| 9,717,351 | B2* | 8/2017 | Law | F16M 11/041 |
| 2012/0224200 | A1* | 9/2012 | Nihashi | B41J 3/46 358/1.12 |
| 2013/0056530 | A1* | 3/2013 | Yokoyama | G07G 1/12 235/3 |
| 2015/0168995 | A1* | 6/2015 | Jeon | G06F 1/1637 361/679.22 |

FOREIGN PATENT DOCUMENTS

| | | |
|---|---|---|
| JP | 64-51598 A | 2/1989 |
| JP | 03-78385 U | 8/1991 |
| JP | 09-114394 A | 5/1997 |
| JP | 09-115058 A | 5/1997 |
| JP | 2010-113411 A | 5/2010 |

OTHER PUBLICATIONS

International Search Report of PCT/JP2012/076371 dated Nov. 27, 2012.
Communication dated Jun. 19, 2018, from the Intellectual Property of India in counterpart application No. 2156/DELNP/2014.

* cited by examiner

DISPLAY DEVICE, AND POS TERMINAL DEVICE

CROSS REFERENCE TO RELATED APPLICATIONS

This is a National Stage of International Application No. PCT/JP2012/076371 filed Oct. 4, 2012, claiming priority based on Japanese Patent Application No. 2011-237161 filed Oct. 28, 2011, the contents of all of which are incorporated herein by reference in their entirety.

TECHNICAL FIELD

This invention relates to a display device and a POS terminal device.

BACKGROUND ART

Point of Sales (POS) terminal devices to be used as, for example, checkout machines in retail stores may include a customer-side display device configured to display information for a customer who is involved in transactions, as well as a display device configured to display information for an operator (store staff member).

After the POS terminal device is installed, the height of the customer-side display device may need to be adjusted to a position so as to secure the customer's visibility.

In this case, as a structure for adjusting the height of the customer-side display device, there is a structure in which the customer-side display device and a casing of the POS terminal device are coupled to each other through a pole, and a part or all of the pole is configured to be extensible and contractible (to be accommodated in the casing) (Patent Literature 1).

CITATION LIST

Patent Literature

Patent Literature 1: JP-A-H09-115058

DISCLOSURE OF THE INVENTION

Problems to be Solved by the Invention

In the structure as disclosed in Patent Literature 1, however, there is a problem in that the cost is increased when the extension and contraction mechanism is provided.

Further, in the structure as disclosed in Patent Literature 1, a space for accommodating the pole is required in a lower part of the extension and contraction mechanism, but other components cannot be mounted in this space, which hinders downsizing of the POS terminal device.

This invention has been made in view of the above-mentioned problems, and it is therefore an object of this invention to provide a display device capable of easily adjusting the height thereof without providing an extension and contraction mechanism.

Means to Solve the Problems

In order to achieve the above-mentioned object, according to a first aspect of this invention, there is provided a display device, including: a casing; and a display unit to be installed for use onto the casing, the casing and the display unit being available to directly couple to each other, in which a coupling structure between the casing and the display unit is changeable from a state in which the casing and the display unit are directly coupled to each other to a state in which the casing and the display unit are coupled to each other with a pole having a columnar shape and separable along a center axis thereof, which is mounted between the casing and the display unit.

According to a second aspect of this invention, there is provided a POS terminal device, including the display device according to the first aspect.

Effect of the Invention

According to this invention, it is possible to provide the display device capable of easily adjusting the height thereof without providing the extension and contraction mechanism.

BRIEF DESCRIPTION OF THE DRAWINGS

FIG. 6 is a perspective view illustrating a pole piece 7a.

FIG. 8 is a perspective view illustrating a display unit-side coupling piece 9a.

FIG. 9 is a bottom view illustrating the display unit-side coupling piece 9a.

MODE FOR EMBODYING THE INVENTION

Now, an exemplary embodiment of this invention is described in detail with reference to the drawings.

Figure 1:
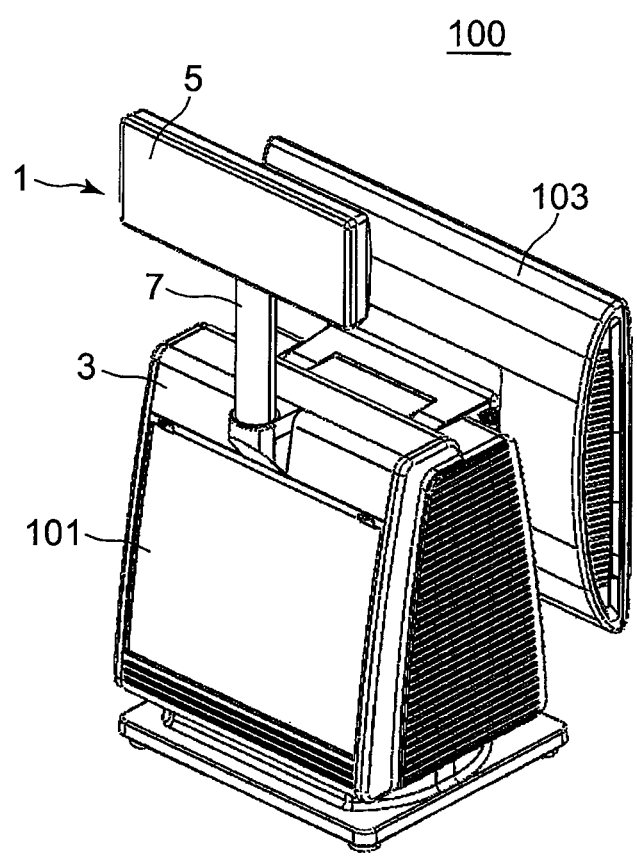
FIG. 1 is a view illustrating a schematic configuration of a POS terminal device 100 including a display device 1 in a case where the display device 1 includes a pole 7.

First, referring to FIG. 1, description is given of a schematic configuration of a POS terminal device 100 including a display device 1 according to this embodiment.

In this case, a POS terminal device for checkout, such as a cash register in a restaurant, is taken as an example of the POS terminal device 100.

As illustrated in FIG. 1, the POS terminal device 100 includes a box-type main body 101 comprising a motherboard (not shown), a power supply unit, and the like mounted thereto, the display device 1, which is provided to the main body 101 and is configured to, for example, display the price of a product for a customer, and a display device 103 including a touch panel, which is provided to a surface opposite to the surface on which the display device 1 is provided and is used by a store staff member to operate the POS terminal device 100 at the time of checkout.

Figure 2:
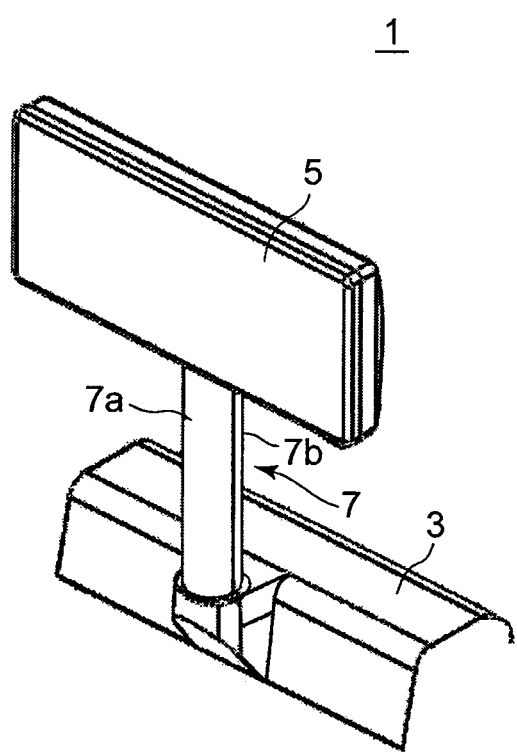
FIG. 2 is a schematic view illustrating the display device 1 in a state in which a display unit 5 and a casing 3 are coupled to each other through the pole 7.
Figure 3:
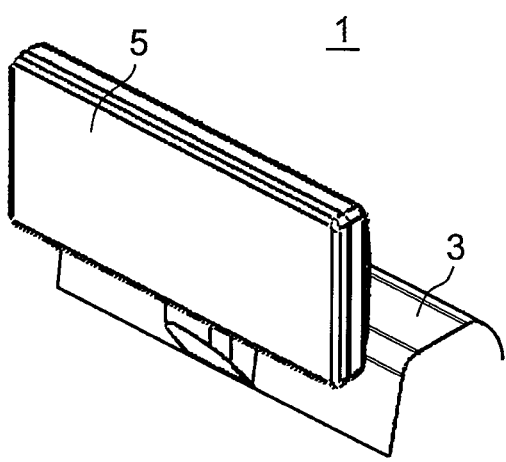
FIG. 3 is a schematic view illustrating the display device 1 in a state in which the display unit 5 and the casing 3 are directly coupled to each other.
Figure 4:
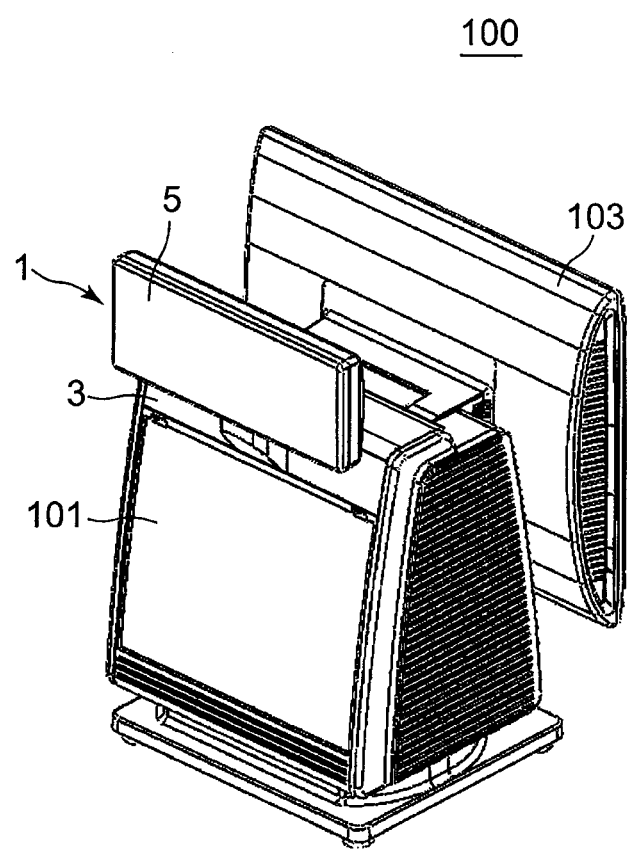
FIG. 4 is a view illustrating the schematic configuration of the POS terminal device 100 including the display device 1 in a case where the display device 1 is in the state in which the display unit 5 and the casing 3 are directly coupled to each other.

Next, referring to FIGS. 2 to 4, a schematic configuration of the display device 1 is described.

As illustrated in FIG. 2, the display device 1 includes a casing 3 coupled to the POS terminal device 100, a display unit 5 provided to the casing 3 and including a vacuum fluorescent display (VFD) or the like, and a columnar (in this case, cylindrical) pole 7 for coupling the display unit 5 and the casing 3 to each other.

Note that, the pole 7 is separable into pole pieces 7a and 7b along a center axis thereof. Under a state in which the pole 7 is separated and removed, the display unit 5 and the casing 3 of the display device 1 can directly be coupled to each other as illustrated in FIGS. 3 and 4.

In the display device 1 described above, depending on whether or not the pole 7 is coupled between the display unit 5 and the casing 3, the height of the display unit 5 with respect to the casing 3 can be adjusted to one of at least two heights without providing an extension and contraction mechanism.

Figure 5:
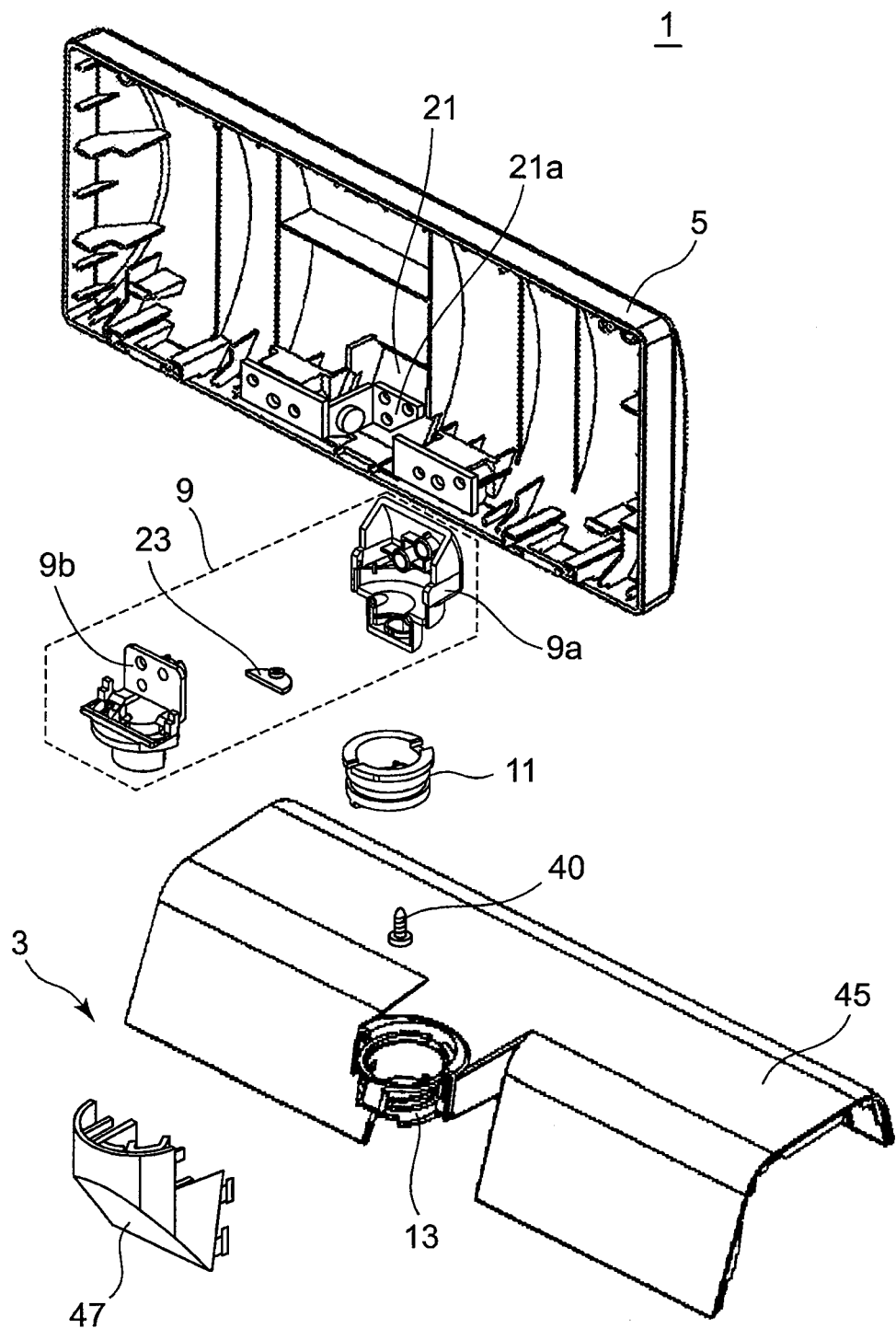
FIG. 5 is an exploded perspective view illustrating the display device 1 with an outer cover of the display unit 5 illustrated alone while the pole 7 is omitted from FIG. 5.
Figure 6:
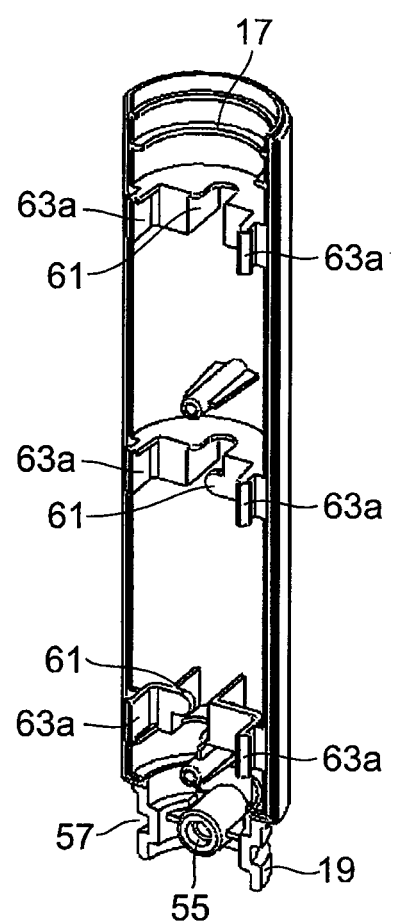
Figure 7:
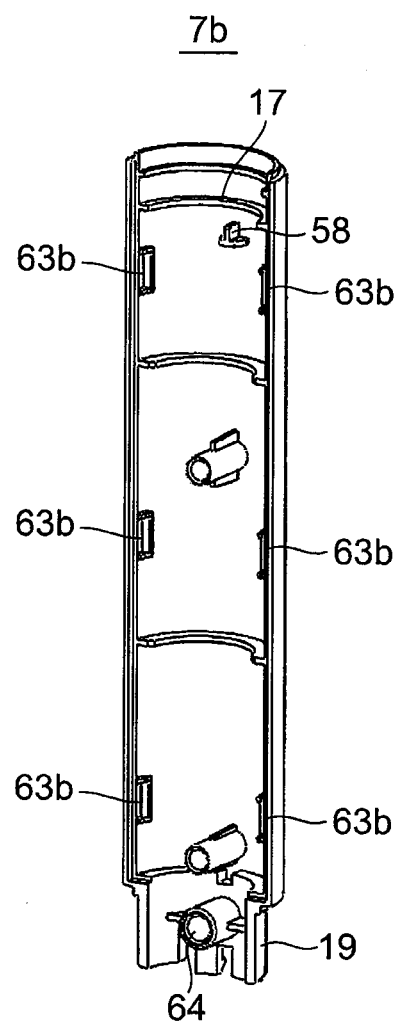
FIG. 7 is a perspective view illustrating a pole piece 7b.

Next, referring to FIGS. 5 to 7, the structure of the display device 1 is described in more detail.

As illustrated in FIG. 5, the display device 1 includes a display unit-side coupling portion 9 held by (in this case, fixed to) the display unit 5, an intermediate coupling portion 11 rotatably held by the display unit-side coupling portion 9, and a casing-side coupling portion 13 provided to the casing 3 and available to couple to the pole 7 or the intermediate coupling portion 11.

On the other hand, as illustrated in FIGS. 6 and 7, the pole 7 includes the pole pieces 7a and 7b. One end portion of each of the pole pieces 7a and 7b includes an upper coupling portion 17 available to couple to the intermediate coupling portion 11, and the other end portion of each of the pole pieces 7a and 7b includes a lower coupling portion 19 to be coupled to (in this case, fixed to) the casing-side coupling portion 13.

In this case, the intermediate coupling portion 11 is rotatable by a predetermined angle with respect to the display unit-side coupling portion 9. Under a state in which the intermediate coupling portion 11 is coupled to the pole 7, the intermediate coupling portion 11 is rotatable by a predetermined angle with respect to the pole 7. Under a state in which the intermediate coupling portion 11 is coupled to the casing-side coupling portion 13, the intermediate coupling portion 11 is rotatable by the predetermined angle with respect to the casing-side coupling portion 13.

Therefore, when the above-mentioned rotatable angle ranges are added together, the display unit 5 is rotatable by 360° or more with respect to the casing 3.

Next, referring to FIGS. 5 to 21, the components of the display device 1 are described in more detail.

As described above, the display unit 5 includes the VFD or the like for displaying information, and as illustrated in FIG. 5, the display unit 5 includes, on its back surface (surface opposite to the display surface), a depressed portion 21 to which the display unit-side coupling portion 9 is coupled. A metal component 21a mounted to the display unit 5 is provided in the depressed portion 21, and holes for coupling the display unit-side coupling portion 9 are provided in the metal component 21a.

Figure 8:
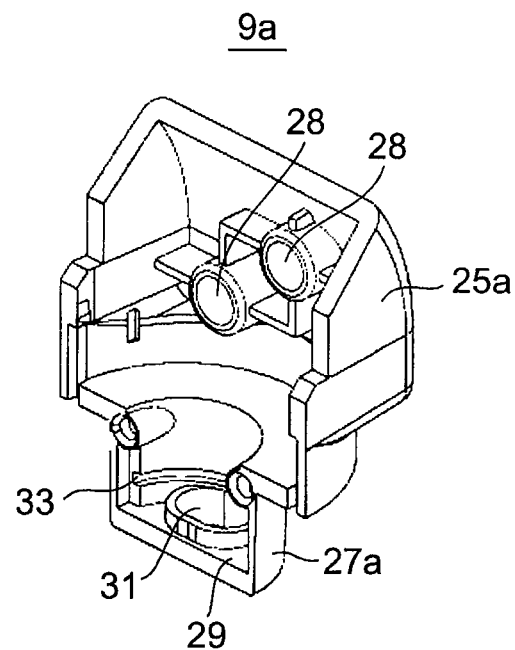
Figure 9:
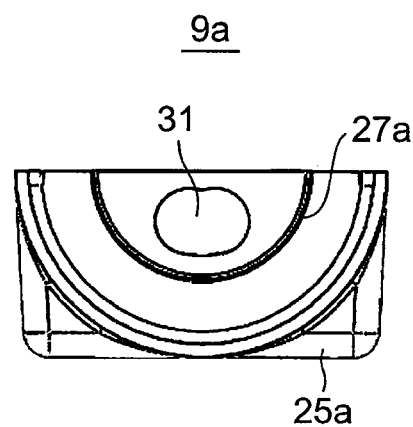
Figure 10:
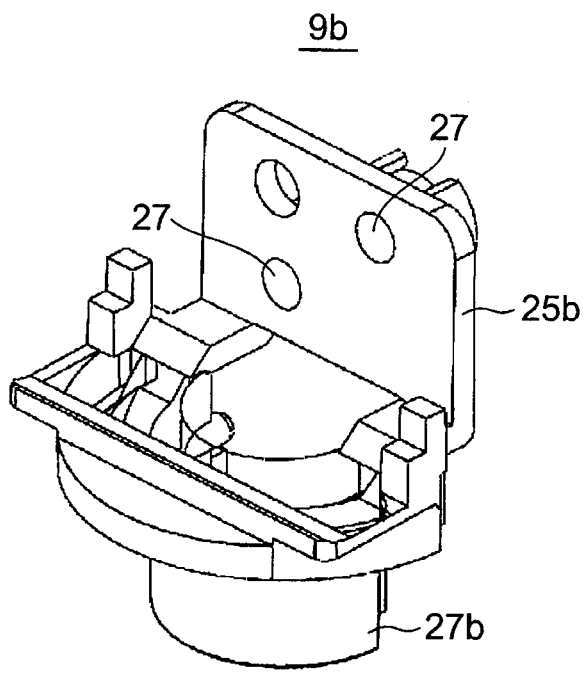
FIG. 10 is a perspective view illustrating a display unit-side coupling piece 9b.
Figure 11:
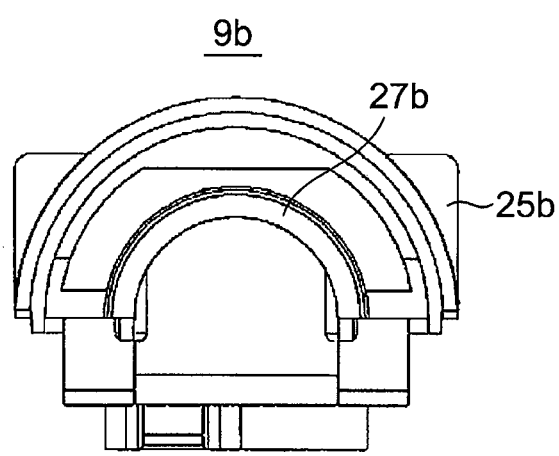
FIG. 11 is a bottom view illustrating the display unit-side coupling piece 9b.

The display unit-side coupling portion 9 includes a display unit-side coupling piece 9a illustrated in FIGS. 8 and 9, a display unit-side coupling piece 9b illustrated in FIGS. 10 and 11, and a plate-like metal component 23 (see FIGS. 5 and 12) provided inside the display unit-side coupling pieces 9a and 9b.

As illustrated in FIGS. 8 to 11, the display unit-side coupling pieces 9a and 9b include projecting portions 25a and 25b having a shape of a projection conforming to the depressed portion 21 of the display unit 5 (under a state in which the display unit-side coupling pieces 9a and 9b are assembled to each other), and cylindrical cups 27a and 27b provided to the projecting portions 25a and 25b, respectively.

As illustrated in FIGS. 8 and 10, threaded holes 28 comprising insert nuts embedded therein are provided in the projecting portion 25a, and holes 27 are provided in the projecting portion 25b. The holes similar to the holes 27 are provided in the metal component 21a mounted to the display unit 5. The metal component 21a is interposed between the display unit-side coupling piece 9a and the display unit-side coupling piece 9b, and screws are inserted into the holes 27 and the holes in the metal component 21a and tightened into the threaded holes 28, respectively. In this manner, the display unit-side coupling piece 9a and the display unit-side coupling piece 9b are coupled to each other, and the display unit-side coupling portion 9 is fixed to the display unit 5.

On the other hand, as illustrated in FIG. 9, the cup 27a has a bottom surface 29, and a slit 31 having an arc shape (in this case, an oval shape) is provided in the bottom surface 29 at a position offset from a center axis of the cup 27a.

Further, as illustrated in FIG. 8, on an inner periphery of the cup 27a, a groove 33 is provided in parallel to the bottom surface 29. The metal component 23 is insertable into the groove 33.

Figure 12:
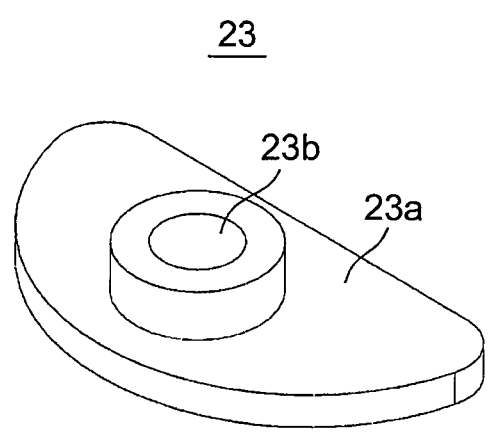
FIG. 12 is a perspective view illustrating a metal component 23.

As illustrated in FIG. 12, the metal component 23 includes a plate-like main body 23a, and a threaded hole 23b comprising internal threads formed therein. Under a state in which the metal component 23 is inserted into the groove 33 of the cup 27a, the threaded hole 23b is exposed through the slit 31.

Figure 13:
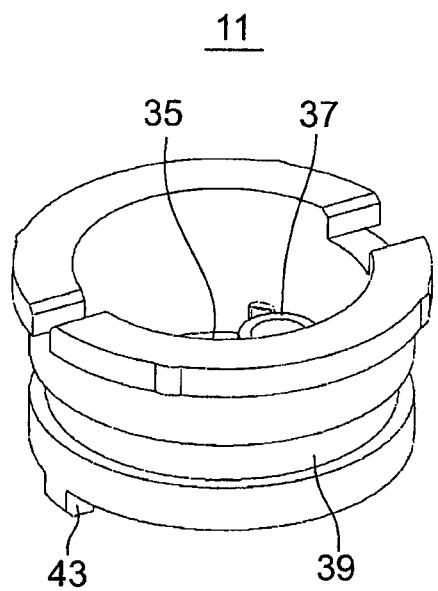
FIG. 13 is a perspective view illustrating an intermediate coupling portion 11.
Figure 14:
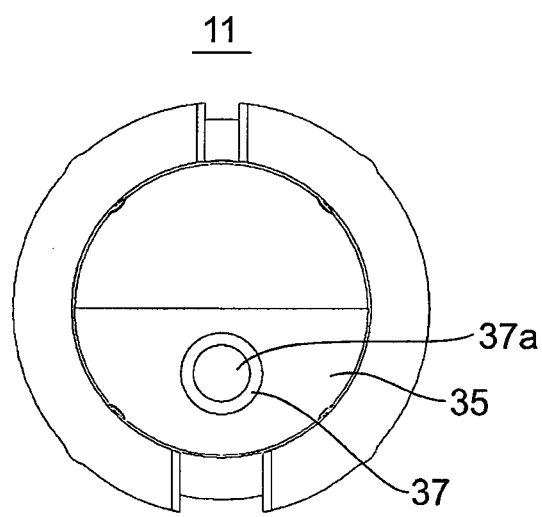
FIG. 14 is a top view illustrating the intermediate coupling portion 11.

As illustrated in FIGS. 13 and 14, the intermediate coupling portion 11 has a shape of a cylindrical cup capable of receiving the cups 27a and 27b of the display unit-side coupling portion 9, and comprises a bottom surface 35. A pin-like boss 37 is provided on the bottom surface 35 at a position offset from a center axis thereof, and a through hole 37a is provided in the boss 37 so as to pass along a center axis thereof.

Further, as illustrated in FIG. 13, on an outer periphery of the intermediate coupling portion 11, a ring-like groove 39 for coupling the intermediate coupling portion 11 to the pole 7 or the casing-side coupling portion 13 is provided in parallel to the bottom surface 35.

Further, an intermediate coupling portion-side protrusion 43 described later is provided on an edge portion of the bottom surface 35 so as to limit the rotation angle.

Under a state in which the intermediate coupling portion 11 receives the cup 27a of the display unit-side coupling portion 9, the boss 37 is inserted into the slit 31 of the display unit-side coupling portion 9.

Figure 15:
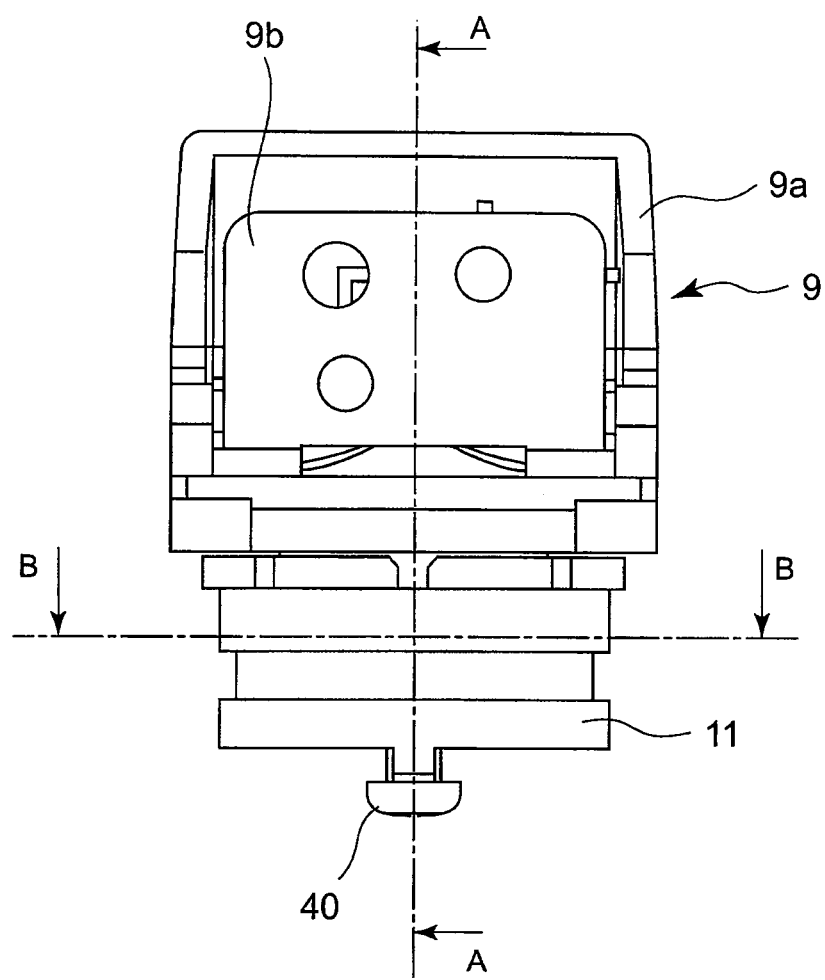
FIG. 15 is a front view illustrating a state in which a display unit-side coupling portion 9 and the intermediate coupling portion 11 are assembled to each other.
Figure 16:
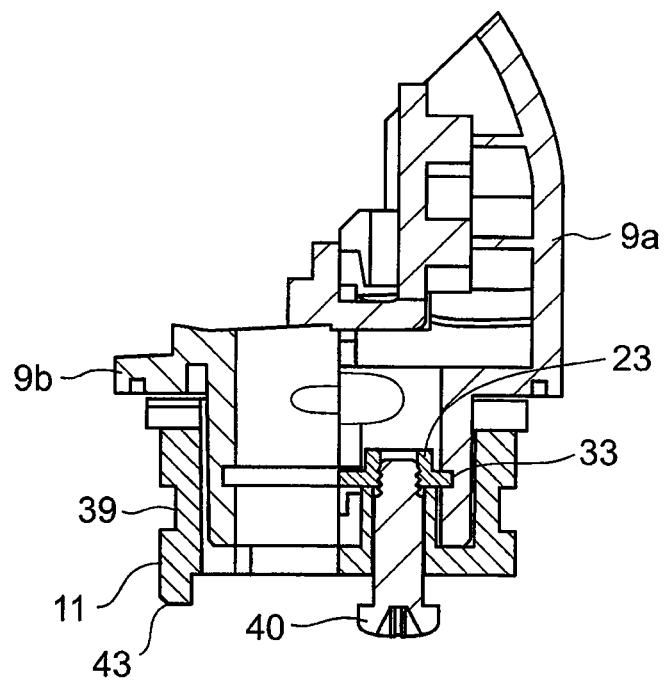
FIG. 16 is a sectional view taken along the line A-A of FIG. 15.
Figure 17:
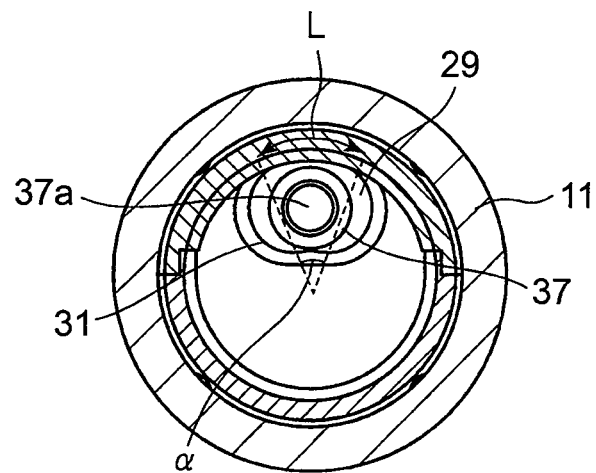
FIG. 17 is a sectional view taken along the line B-B of FIG. 15.

As illustrated in FIGS. 15 to 17, the intermediate coupling portion 11 and the display unit-side coupling portion 9 are coupled to each other by tightening a bolt 40 into the threaded hole 23b of the metal component 23 through the through hole 37a and the slit 31 under a state in which the boss 37 is inserted into the slit 31.

In this state, the intermediate coupling portion 11 is rotatable with respect to the display unit-side coupling portion 9 in a direction indicated by the arrow L of FIG. 17, but as described above, the boss 37 is inserted into the slit 31, and hence a rotatable angle α is limited in conformity to the shape of the slit 31. In the shape of the slit 31 illustrated in FIG. 17 (in this case, the oval shape), the angle α is about 10° to 15°.

As illustrated in FIG. 5, the casing 3 includes a main body 45, which forms a part of an outer cover of the main body 101 of the POS terminal device 100, the cylindrical casing-side coupling portion 13, which is provided to the main body 45 with an inner peripheral shape conforming to the outer peripheries of the intermediate coupling portion 11 and the pole 7, and is available to couple to the intermediate coupling portion 11 and the pole 7, and a casing cover 47, which is available to couple to the main body 45 so as to cover an outer periphery of the casing-side coupling portion 13.

Figure 18:
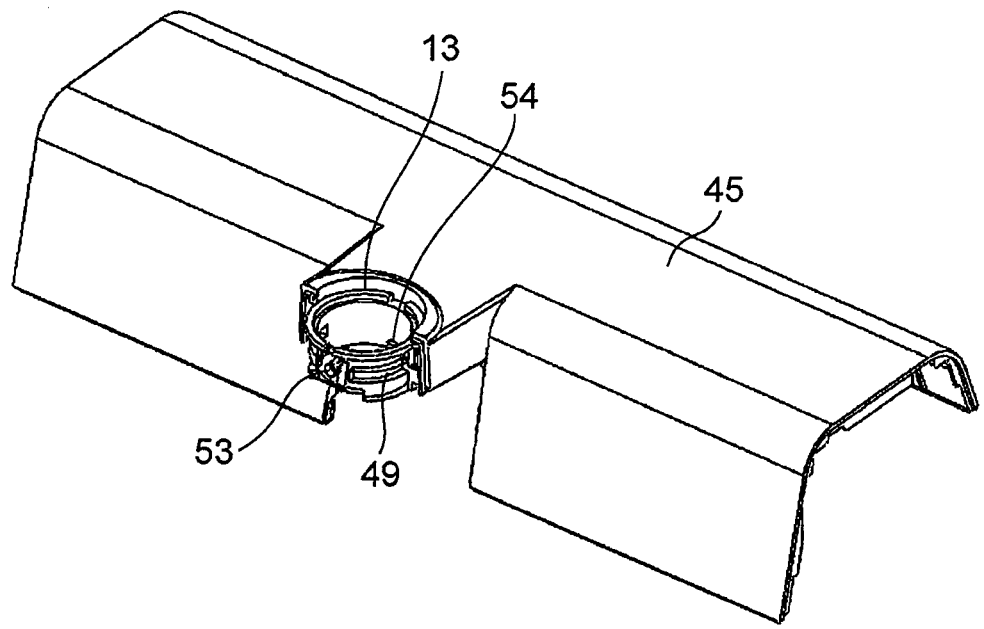
FIG. 18 is a perspective view illustrating a main body 45 of the casing 3.

As illustrated in FIG. 18, a slit 49 (through hole) conforming to the shape of the groove 39 of the intermediate coupling portion 11 is provided in a side surface of the casing-side coupling portion 13. Under a state in which the intermediate coupling portion 11 is coupled to the casing-side coupling portion 13, the groove 39 is exposed through the slit 49.

Further, a hole 53 into which a screw 51 (described later) for fixing the pole 7 is to be inserted is provided in the side surface of the casing-side coupling portion 13.

Figure 21:
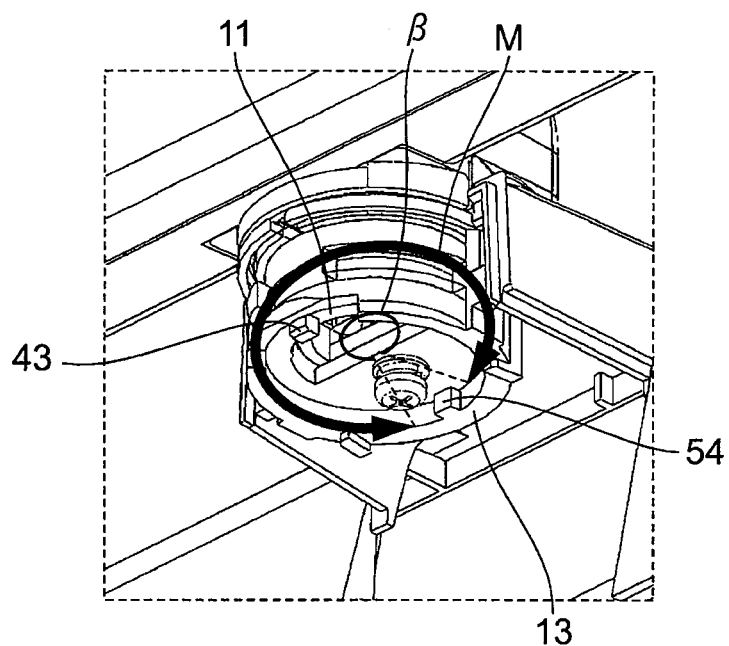
FIG. 21 is an enlarged view illustrating the vicinity of the intermediate coupling portion 11 and a casing-side coupling portion 13 of FIG. 20.

Still Further, on an inner periphery of the casing-side coupling portion 13, a casing-side protrusion 54 is provided at a position to be brought into contact with the intermediate coupling portion-side protrusion 43 (see FIG. 21).

Figure 19:
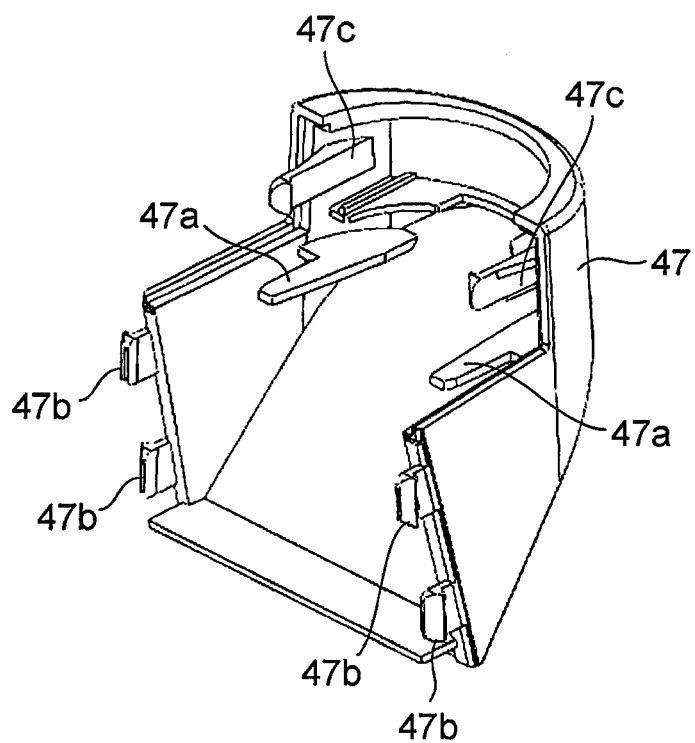
FIG. 19 is a perspective view illustrating a casing cover 47 of the casing 3.

As illustrated in FIG. 19, the casing cover 47 includes, on a side surface to be opposed to the slit 49 under a state in which the casing cover 47 is coupled to the casing 3, plate-like insertion plates 47a insertable into the slit 49, a groove 57 of the pole piece 7a (described later), and the groove 39 of the intermediate coupling portion 11. Further, the casing cover 47 includes engagement claws 47b and engagement claws 47c, which engage with ribs provided at corresponding positions on the casing 3 so that the casing cover 47 is fixed to the casing 3.

As illustrated in FIGS. 6 and 7, the pole 7 has such a shape that the pole pieces 7a and 7b obtained by separating a cylinder into two pieces are assembled to each other.

The ring-like upper coupling portion 17 (pole-side coupling portion) conforming to the shape of the groove 39 of the intermediate coupling portion 11 is provided on an inner periphery of the one end portion (in FIGS. 6 and 7, the upper end) of each of the pole pieces 7a and 7b. In the vicinity of the upper coupling portion 17 of the pole piece 7b, a pole-side protrusion 58 is provided at a position to be brought into contact with the intermediate coupling portion-side protrusion 43 of the intermediate coupling portion 11 under a state in which the upper coupling portion 17 is inserted into the groove 39 of the intermediate coupling portion 11.

The lower coupling portion 19 insertable into the casing-side coupling portion 13 is provided on an outer periphery of the other end portion (in FIGS. 6 and 7, the lower end) of each of the pole pieces 7a and 7b.

Further, a hole 55 into which the screw 51 (described later) is to be inserted is provided in the lower coupling portion 19 of the pole piece 7a. A threaded hole 64 having an insert nut embedded therein is provided in the lower coupling portion 19 of the pole piece 7b.

Further, the groove 57 into which the insertion plates 47a of the casing cover 47 are to be inserted is provided on an outer periphery of the lower coupling portion 19 of the pole piece 7a.

On the other hand, cable holding portions 61 having a shape of a depression for holding a cable 59 (described later) that connects the display unit 5 to the motherboard (not shown) (control unit) inside the POS terminal device 100 are provided on the inner periphery of the pole piece 7a.

Further, hook-like coupling portions 63a for coupling the pole piece 7a to the pole piece 7b are provided on the inner periphery of the pole piece 7a. Coupling portions 63b engageable with the respective coupling portions 63a are provided on the inner periphery of the pole piece 7b.

The coupling portions 63a and the coupling portions 63b engage with each other by mating end surfaces of the pole piece 7a and the pole piece 7b (cut surfaces of the cylinder) under a state in which axial positions of the coupling portions 63a and the coupling portions 63b are shifted from each other, and sliding one of the pole piece 7a and the pole piece 7b in the axial direction. In this manner, the pole piece 7a and the pole piece 7b are integrated into the pole 7.

Figure 20:
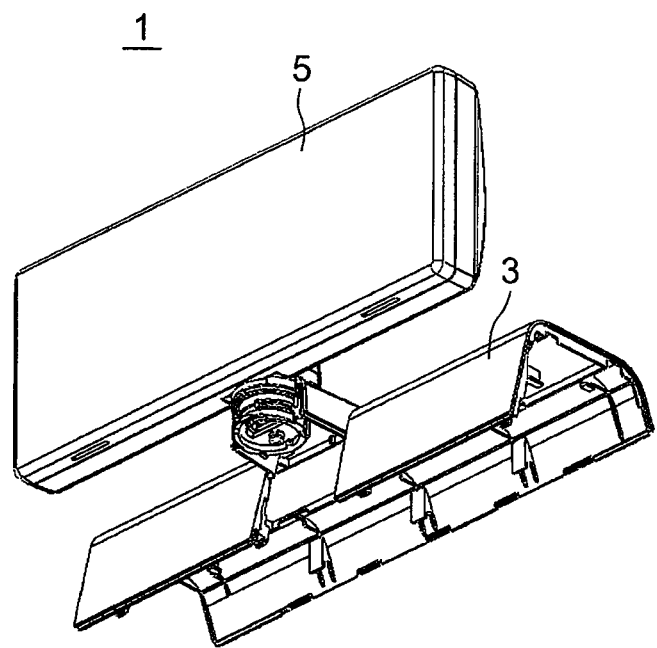
FIG. 20 is a perspective view illustrating the state in which the display unit 5 and the casing 3 are directly coupled to each other with the casing cover 47 omitted from FIG. 20.

The intermediate coupling portion 11 and the casing 3 are coupled to each other as illustrated in FIG. 20 by inserting the intermediate coupling portion 11 into the casing-side coupling portion 13.

Although the illustration is omitted in FIG. 20, the casing cover 47 is further coupled to the casing 3, and the insertion plates 47a of the casing cover 47 (not shown in FIG. 20) are inserted into the slit 49 of the casing-side coupling portion 13 and the groove 39 of the intermediate coupling portion 11. Thus, the insertion plates 47a serve as retention members so that the casing cover 47 and the casing 3 do not disengage from each other.

In this state, the intermediate coupling portion 11 is rotatable inside the casing-side coupling portion 13 in a direction indicated by the arrow M illustrated in FIG. 21, but when the intermediate coupling portion 11 is rotated by a predetermined angle β illustrated in FIG. 21, the intermediate coupling portion-side protrusion 43 and the casing-side protrusion 54 are brought into contact with each other so that the rotation is limited.

This is because the cable 59 may be twisted and damaged due to the rotation when no limitation is imposed on the rotation angle of the intermediate coupling portion 11 (that is, when the rotatable angle is set to an infinity).

The angle β differs depending on the shapes of the intermediate coupling portion-side protrusion 43 and the casing-side protrusion 54. In the shapes illustrated in FIG. 21, the angle β is about 350°.

Note that, the intermediate coupling portion 11 is rotatable by the angle α (10° to 15°) with respect to the display unit-side coupling portion 9 as described above, and hence the rotatable angle of the display unit 5 with respect to the casing 3 is α+β, that is, 360° or more. As a result, the rotation of 360° or more can be achieved while protecting the cable 59 through the rotational limitation.

When the pole 7 is to be provided between the casing 3 and the display unit 5, on the other hand, the groove 39 of the intermediate coupling portion 11 is inserted into the upper coupling portion 17 of each of the pole pieces 7a and 7b (see FIGS. 6 and 7), and the pole piece 7a and the pole piece 7b are coupled to each other. In this manner, the display unit 5 and the pole 7 are coupled to each other. Then, the lower coupling portion 19 of the pole 7 is inserted into the casing-side coupling portion 13, and the screw 51 is inserted into the hole 53 and the hole 55 and tightened into the threaded hole 64 comprising the insert nut embedded therein. In this manner, the pole 7 is fixed to the casing 3.

In this state, the intermediate coupling portion 11 is rotatable inside the upper coupling portion 17 (that is, rotatable with respect to the pole 7), but when the intermediate coupling portion 11 is rotated by the predetermined angle β, the intermediate coupling portion-side protrusion 43 and the pole-side protrusion 58 (see FIG. 7) are brought into contact with each other so that the rotation is limited.

The angle β differs depending on the shapes of the intermediate coupling portion-side protrusion 43 and the pole-side protrusion 58. In the shapes illustrated in FIG. 13 and FIG. 7, the angle β is about 350°.

Therefore, even when the pole 7 is provided between the casing 3 and the display unit 5, the rotation angle of the display unit 5 with respect to the casing 3 is α+β, that is, 360° or more. As a result, the rotation of 360° or more can be achieved while protecting the cable 59 through the rotational limitation.

The components of the display device 1 have been detailed through the above description.

Next, referring to FIGS. 22 to 27, description is given of a procedure of adjusting the height of the display unit 5 with respect to the casing 3.

Now, description is given of a case where the coupling structure between the casing and the display unit is changed from the state in which the casing 3 and the display unit 5 are directly coupled to each other as illustrated in FIG. 4 to the state in which the pole 7 is coupled between the casing 3 and the display unit 5 as illustrated in FIG. 1, to thereby increase the height of the display unit 5 with respect to the casing 3.

Note that, a procedure of decreasing the height of the display unit 5 with respect to the casing 3, specifically, a procedure of directly coupling the casing 3 and the display unit 5 to each other by removing the pole 7 under the state in which the pole 7 is coupled between the casing 3 and the display unit 5 is reverse to the procedure described below, and description thereof is therefore omitted herein.

Figure 22:
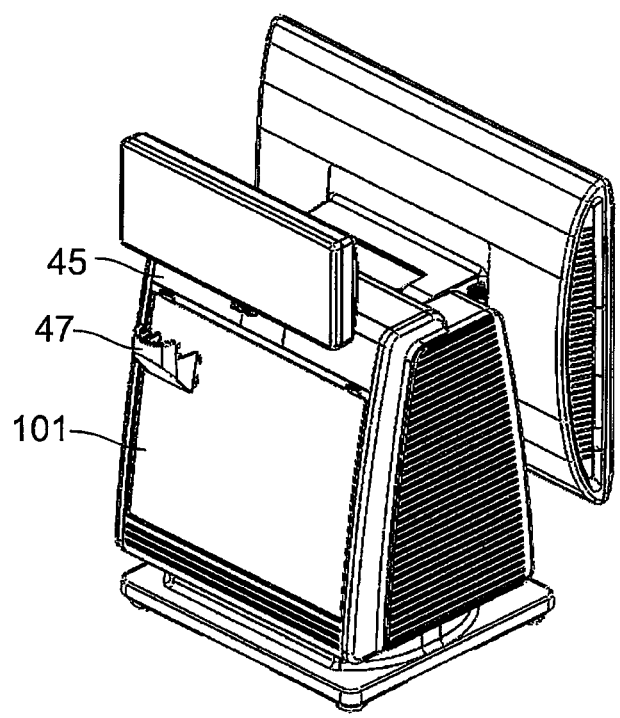
FIG. 22 is a perspective view illustrating a procedure of adjusting the height of the display unit 5 with respect to the casing 3 in a case where the coupling structure between the casing 3 and the display unit 5 is changed from the state in which the casing 3 and the display unit 5 are directly coupled to each other as illustrated in FIG. 4 to the state in which the pole 7 is coupled between the casing 3 and the display unit 5 as illustrated in FIG. 1, to thereby increase the height of the display unit 5 with respect to the casing 3.

First, as illustrated in FIG. 22, the casing cover 47 is removed from the main body 45 of the casing 3.

Thus, the insertion plates 47a of the casing cover 47 disengage from the slit 49 of the casing-side coupling portion 13 and the groove 39 of the intermediate coupling portion 11, and hence the fixing of the intermediate coupling portion 11 (display unit 5) to the casing 3 is released.

Figure 23:
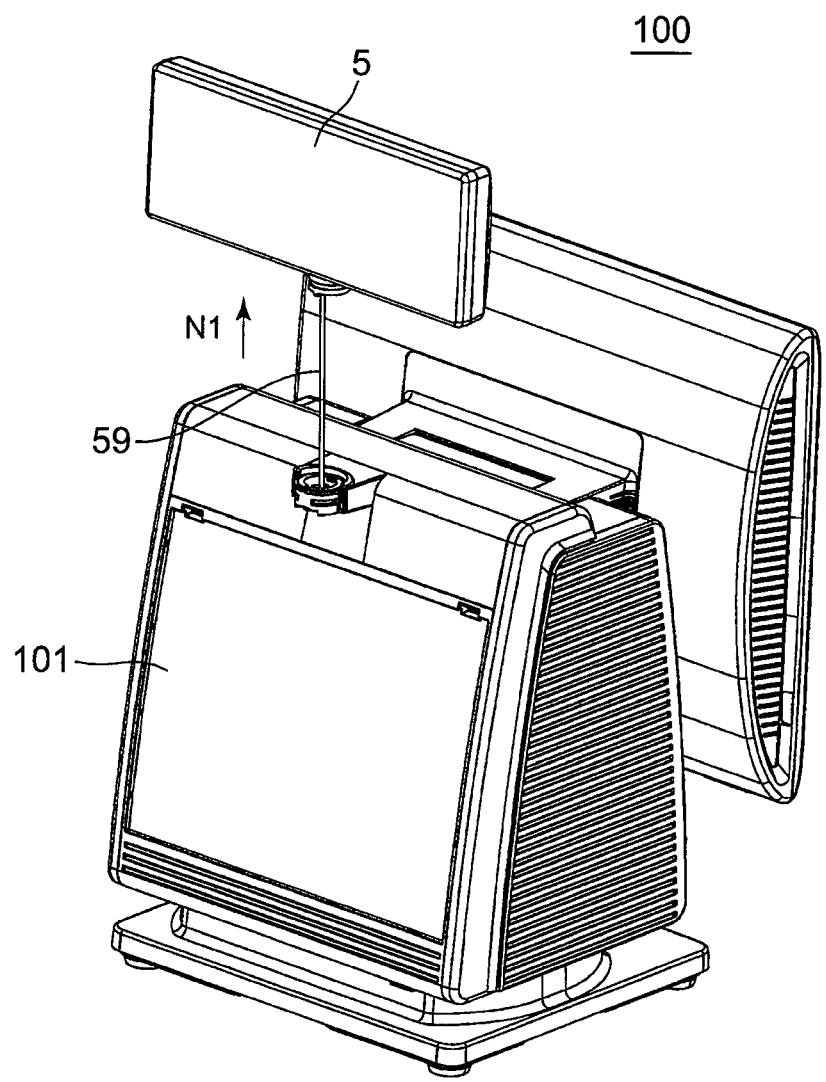
FIG. 23 is a perspective view illustrating the procedure of adjusting the height of the display unit 5 with respect to the casing 3 in the case where the coupling structure between the casing 3 and the display unit 5 is changed from the state in which the casing 3 and the display unit 5 are directly coupled to each other as illustrated in FIG. 4 to the state in which the pole 7 is coupled between the casing 3 and the display unit 5 as illustrated in FIG. 1, to thereby increase the height of the display unit 5 with respect to the casing 3.

Subsequently, as illustrated in FIG. 23, the display unit 5 is raised (moved in the direction N1), and the cable 59 is drawn out of the main body 101 of the POS terminal device 100.

Figure 24:
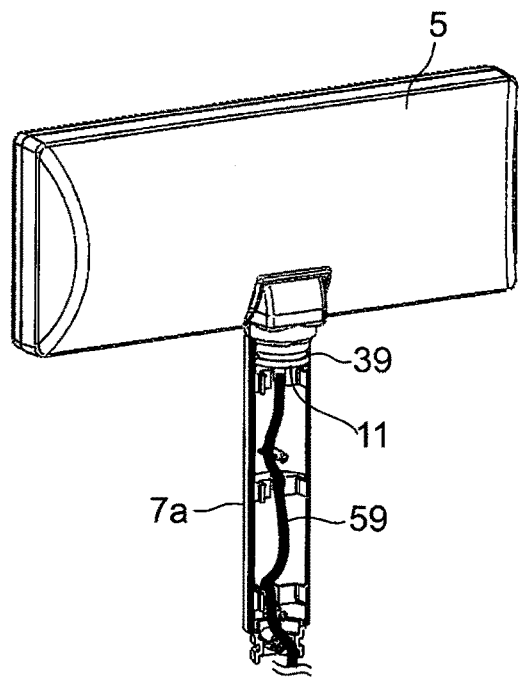
FIG. 24 is a perspective view illustrating the procedure of adjusting the height of the display unit 5 with respect to the casing 3 in the case where the coupling structure between the casing 3 and the display unit 5 is changed from the state in which the casing 3 and the display unit 5 are directly coupled to each other as illustrated in FIG. 4 to the state in which the pole 7 is coupled between the casing 3 and the display unit 5 as illustrated in FIG. 1, to thereby increase the height of the display unit 5 with respect to the casing 3.

Subsequently, as illustrated in FIG. 24, the upper coupling portion 17 of the pole piece 7a (see FIG. 6) is inserted into the groove 39 of the intermediate coupling portion 11, and the pole piece 7a and the intermediate coupling portion 11 are assembled to each other. Then, the cable 59 is inserted into the cable holding portions 61 of the pole piece 7a (see FIG. 6), and the cable is held by the cable holding portions 61.

Figure 25:
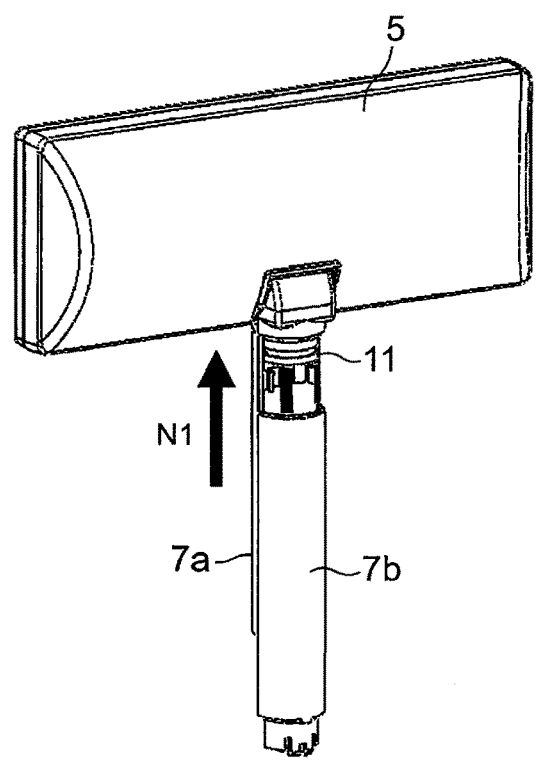
FIG. 25 is a perspective view illustrating the procedure of adjusting the height of the display unit 5 with respect to the casing 3 in the case where the coupling structure between the casing 3 and the display unit 5 is changed from the state in which the casing 3 and the display unit 5 are directly coupled to each other as illustrated in FIG. 4 to the state in which the pole 7 is coupled between the casing 3 and the display unit 5 as illustrated in FIG. 1, to thereby increase the height of the display unit 5 with respect to the casing 3.

Subsequently, as illustrated in FIG. 25, the end surface of the pole piece 7b is mated with the end surface of the pole piece 7a under a state in which the axial positions of the coupling portions 63a and the coupling portions 63b are shifted from each other, and the pole piece 7b is slid in the direction N1 (axial direction), to thereby engage the coupling portions 63a and the coupling portions 63b with each other. In this manner, the pole piece 7a and the pole piece 7b are integrated into the pole 7 (see FIGS. 6 and 7).

Figure 26:
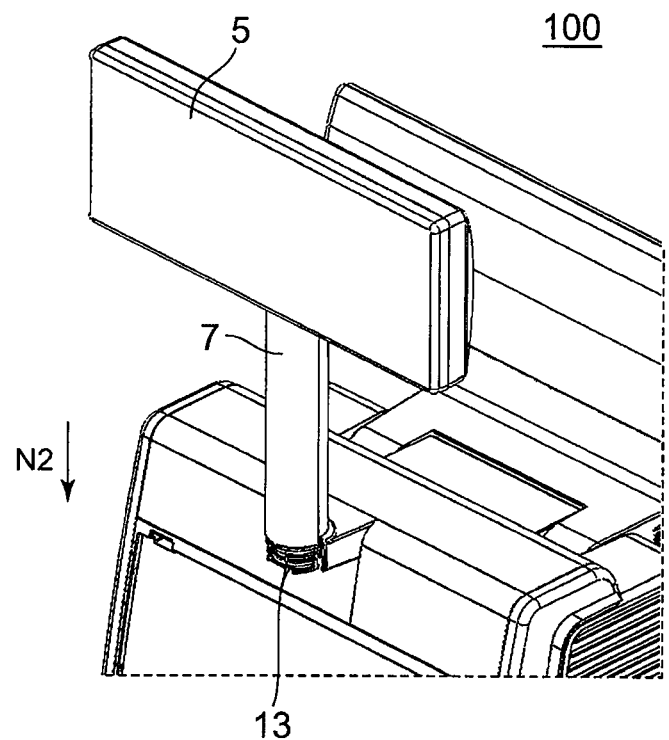
FIG. 26 is a perspective view illustrating the procedure of adjusting the height of the display unit 5 with respect to the casing 3 in the case where the coupling structure between the casing 3 and the display unit 5 is changed from the state in which the casing 3 and the display unit 5 are directly coupled to each other as illustrated in FIG. 4 to the state in which the pole 7 is coupled between the casing 3 and the display unit 5 as illustrated in FIG. 1, to thereby increase the height of the display unit 5 with respect to the casing 3.

Subsequently, as illustrated in FIG. 26, the pole 7 is moved in the direction N2, and the lower coupling portion 19 (see FIGS. 6 and 7) is inserted into the casing-side coupling portion 13.

Figure 27:
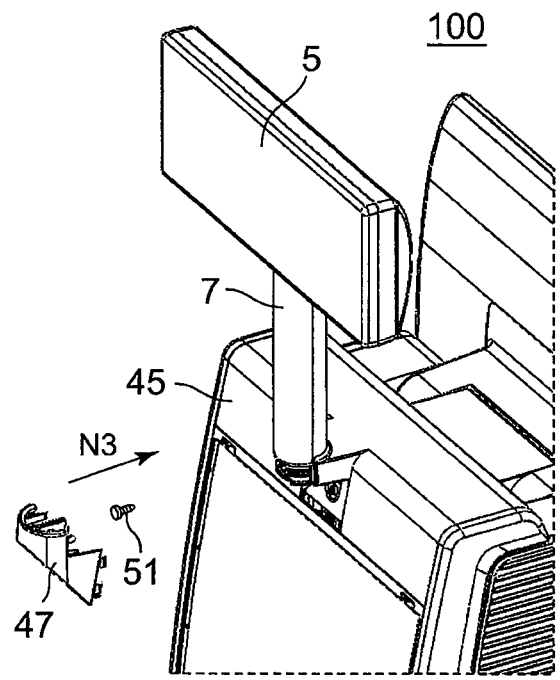
FIG. 27 is a perspective view illustrating the procedure of adjusting the height of the display unit 5 with respect to the casing 3 in the case where the coupling structure between the casing 3 and the display unit 5 is changed from the state in which the casing 3 and the display unit 5 are directly coupled to each other as illustrated in FIG. 4 to the state in which the pole 7 is coupled between the casing 3 and the display unit 5 as illustrated in FIG. 1, to thereby increase the height of the display unit 5 with respect to the casing 3.

Subsequently, as illustrated in FIG. 27, the screw 51 is inserted into the hole 53 (see FIG. 18) and the hole 55 (see FIGS. 6 and 7) and tightened into the threaded hole 64 comprising the insert nut embedded therein. In this manner, the pole 7 is fixed to the casing 3 (see the arrow N3).

Finally, as illustrated in FIG. 27, the casing cover 47 is mounted to the main body 45 of the casing 3 (see the arrow N3).

Through the above-mentioned procedure, the pole 7 is coupled between the casing 3 and the display unit 5.

As described above, according to this embodiment, the display device 1 includes the casing 3, the display unit 5 provided to the casing 3, and the columnar pole 7 for coupling the display unit 5 and the casing 3 to each other. The pole 7 is separable into the pole pieces 7a and 7b along the center axis thereof. Under a state in which the pole 7 is separated and removed, the display unit 5 and the casing 3 of the display device 1 can directly be coupled to each other.

Therefore, in the display device 1, depending on whether or not the pole 7 is coupled between the display unit 5 and the casing 3, the height of the display unit 5 with respect to the casing 3 can be adjusted to one of at least two heights.

That is, in the display device 1, the height of the display unit 5 with respect to the casing 3 can be adjusted without providing an extension and contraction mechanism.

Further, according to this embodiment, in the display device 1, no special tool is required in the work of coupling the pole 7 between the display unit 5 and the casing 3, or directly coupling the display unit 5 and the casing 3 to each other by removing the pole 7 from the display unit 5 and the casing 3. Therefore, the above-mentioned work can be carried out in customer sites where the POS terminal device 100 is installed.

Further, according to this embodiment, the display device 1 includes the display unit-side coupling portion 9 held by the display unit 5, the intermediate coupling portion 11 rotatably held by the display unit-side coupling portion 9, and the casing-side coupling portion 13 provided to the casing 3 and available to couple to the pole 7 or the intermediate coupling portion 11. The display unit-side coupling portion 9 is rotatable by the predetermined angle α with respect to the intermediate coupling portion 11. Under a state in which the intermediate coupling portion 11 is coupled to the pole 7, the intermediate coupling portion 11 is rotatable by the predetermined angle β with respect to the pole 7. Under a state in which the intermediate coupling portion 11 is coupled to the casing-side coupling portion 13, the intermediate coupling portion 11 is rotatable by the predetermined angle β with respect to the casing-side coupling portion 13. When the rotatable ranges (angle α and angle β) are added together, the display unit 5 is rotatable by 360° or more with respect to the casing 3.

Therefore, in the display device 1, the display unit 5 is rotatable by 360° or more with respect to the casing 3 while protecting the cable 59 through the rotational limitation.

INDUSTRIAL APPLICABILITY

The above-mentioned embodiment is directed to the case where this invention is applied to the POS terminal device 100 for checkout in a restaurant, but this invention is not limited to this case, and is applicable to all information devices whose display unit needs to be adjusted in height.

Further, in the above-mentioned embodiment, the slit 31 of the display unit-side coupling portion 9 has an oval shape, but the shape is not limited to the oval shape, and any arc shape may be employed as long as the movement of the boss 37 (that is, the rotation of the intermediate coupling portion 11) can be limited.

This application is based on and claims the benefit of priority from Japanese Patent Application No. 2011-237161, filed on Oct. 28, 2011, the disclosure of which is incorporated herein by reference in its entirety.

REFERENCE SIGNS LIST 1 display device
3 casing
5 display unit
7 pole
7a pole piece
7b pole piece
9 display unit-side coupling portion
9a display unit-side coupling piece
9b display unit-side coupling piece
11 intermediate coupling portion
13 casing-side coupling portion
17 upper coupling portion
19 lower coupling portion
21 depressed portion
21a metal component
23 metal component
23a main body
23b threaded hole
25a projecting portion
27 hole
27a cup
28 threaded hole
29 bottom surface
31 slit
33 groove
35 bottom surface
37 boss
37a through hole
39 groove
40 bolt
43 intermediate coupling portion-side protrusion
45 main body
47 casing cover
47a insertion plate
47b engagement claw
47c engagement claw
49 slit
51 screw
53 hole
54 casing-side protrusion
55 hole
57 groove
58 pole-side protrusion
59 cable
61 cable holding portion
63a coupling portion
63b coupling portion 64 threaded hole
100 POS terminal device
101 main body
103 display device including touch panel

The invention claimed is:

1. A display device, comprising:
   a casing; and
   a display unit to be installed for use onto the casing,
   the casing and the display unit being available to directly couple to each other,
   wherein a coupling structure between the casing and the display unit is changeable from a state in which the casing and the display unit are directly coupled to each other to a state in which the casing and the display unit are coupled to each other with a pole having a columnar shape and separable along a center axis thereof, which is mounted between the casing and the display unit, and the display unit is provided so as to be rotatable with respect to the casing both under the state in which the casing and the display unit are directly coupled to each other, and under the state in which the casing and the display unit are coupled to each other with the pole,
   the display device further comprising:
   a display unit-side coupling portion provided to the display unit,
   a casing-side coupling portion provided to the casing, available to rotatably couple to the display unit-side coupling portion,
   an upper coupling portion provided to one end portion of the pole available to rotatably couple to the display unit-side coupling portion,
   a lower coupling portion provided to another end portion of the pole available to insert and to be fixed to the casing-side coupling portion, and
   an intermediate coupling portion rotatably held by the display unit-side coupling portion,
   wherein the display unit-side coupling portion has a ring-like groove portion on the outer periphery thereof, the groove portion is provided to an outer periphery of the intermediate coupling portion,
   wherein the pole has a cylindrical shape, and the pole further comprises, on the inner periphery of the upper coupling portion, a ring-like pole-side coupling portion insertable into the ring-like groove portion,
   wherein the intermediate coupling portion is rotatably held by the pole through insertion of the ring-like pole-side coupling portion into the ring-like groove portion,
   wherein the intermediate coupling portion is rotatably held by the casing-side coupling portion and, the intermediate coupling portion is rotatably held by the upper coupling portion.

2. A display device according to claim 1, wherein the display unit-side coupling portion comprises a cup having a cylindrical shape with a bottom surface, the bottom surface having a slit formed into an arc shape,
   wherein the intermediate coupling portion has a cylindrical shape with a bottom surface capable of receiving the cup of the display unit-side coupling portion, the bottom surface comprising a pin-like boss inserted into the slit, the pin-like boss being provided at a position offset from a center axis of the bottom surface, and
   wherein the intermediate coupling portion is rotatable with respect to the display unit-side coupling portion, and a rotation angle of the intermediate coupling portion is limited by the slit.

3. A display device according to claim 2,
   wherein the intermediate coupling portion comprises an intermediate coupling portion-side protruding portion on an outer periphery thereof,
   wherein the pole comprises, on an inner periphery of the one end portion thereof, a pole-side protruding portion to be brought into contact with the intermediate coupling portion-side protruding portion,
   wherein the casing-side coupling portion comprises, on an inner periphery thereof, a casing-side protruding portion to be brought into contact with the intermediate coupling portion-side protruding portion, and
   wherein the rotation angle of the intermediate coupling portion is limited through contact between the intermediate coupling portion-side protruding portion and the pole-side protruding portion, or between the intermediate coupling portion-side protruding portion and the casing-side protruding portion.

4. A display device according to claim 3,
   wherein each of the slit, the pin-like boss, the intermediate coupling portion-side protruding portion, the pole-side protruding portion, and the casing-side protruding portion has a shape that allows the display unit to rotate by 360° or more with respect to the casing through addition of a rotatable range of the intermediate coupling portion with respect to the display unit-side coupling portion and a rotatable range of the intermediate coupling portion with respect to the pole or the casing-side coupling portion.

5. A display device according to claim 4,
   wherein the casing comprises a casing cover which is available to couple to the casing so as to cover the casing-side coupling portion,
   the casing cover comprises an insertion plate insertable into the ring-like groove portion,
   the casing-side coupling portion has slit, the slit is provided so that the ring-like groove portion is exposed through the slit under a state in which the intermediate coupling portion is coupled to the casing-side coupling portion,
   wherein, the intermediate coupling portion is rotatably held to casing by inserting the insertion plate to the ring-like groove portion when the casing cover is coupled to the casing.

6. A display device according to claim 1, wherein the slit has an oval shape.

7. A display device according to claim 1,
   wherein the pole comprises a structure in which a cylinder is separated into two pieces along a center axis thereof.

8. A POS terminal device, comprising the display device according to claim 1.

* * * * *